(12) United States Patent
Toshima

(10) Patent No.: US 8,181,191 B2
(45) Date of Patent: May 15, 2012

(54) MEDIA PROCESSING DEVICE AND CONTROL METHOD FOR A MEDIA PROCESSING DEVICE

(75) Inventor: Kazuya Toshima, Ueda (JP)

(73) Assignee: Sieko Epson Corporation, Tokyo (JP)

( * ) Notice: Subject to any disclaimer, the term of this patent is extended or adjusted under 35 U.S.C. 154(b) by 879 days.

(21) Appl. No.: 12/284,196

(22) Filed: Sep. 18, 2008

(65) Prior Publication Data

US 2009/0073821 A1    Mar. 19, 2009

(30) Foreign Application Priority Data

Sep. 18, 2007  (JP) ................................ 2007-240724

(51) Int. Cl.
*G11B 17/04* (2006.01)
*G11B 21/08* (2006.01)

(52) U.S. Cl. .................................... 720/619; 369/34.01

(58) Field of Classification Search ............... 369/30.85, 369/30.78, 30.69, 30.87, 30.9, 30.34, 30.81, 369/30.77, 30.92, 34.01, 30.29, 30.32, 30.28; 720/619, 623, 624, 610, 632, 615, 607, 608
See application file for complete search history.

(56) References Cited

U.S. PATENT DOCUMENTS

| | | | |
|---|---|---|---|
| 5,371,573 A | 12/1994 | Kagaya et al. | |
| 6,400,659 B1 | 6/2002 | Kitaoka | |
| 6,481,093 B1 * | 11/2002 | Ruden et al. | 29/603.03 |
| 7,954,118 B2 * | 5/2011 | Douglass et al. | 720/621 |
| 2005/0157605 A1 | 7/2005 | Lilland et al. | |
| 2007/0203946 A1 | 8/2007 | Maeshima et al. | |
| 2008/0105142 A1 * | 5/2008 | Ichikawa et al. | 101/35 |
| 2010/0072689 A1 * | 3/2010 | Toshima et al. | 271/3.14 |

FOREIGN PATENT DOCUMENTS

| | | |
|---|---|---|
| EP | 0729077 A2 | 8/1996 |
| JP | 6-127809 | 5/1994 |
| JP | 06-247617 | 9/1994 |
| JP | 2000-219376 | 8/2000 |
| JP | 2000-260172 | 9/2000 |
| JP | 2002-56584 | 2/2002 |
| JP | 2006172559 A | 6/2006 |
| JP | 2006202379 A | 8/2006 |
| JP | 2006-321648 | 11/2006 |
| JP | 2007-213781 A | 8/2007 |

OTHER PUBLICATIONS

European Search Report for 08015720.9, dated Sep. 9, 2009. (6 pages).

* cited by examiner

*Primary Examiner* — Allen Cao
(74) *Attorney, Agent, or Firm* — Nutter McClennen & Fish LLP; John J. Penny, V.

(57) ABSTRACT

A media processing device does not execute a media transportation process if the height of media stacked in a media storage unit is at an over capacity level, and reliably prevents problems such as damage to the media transportation mechanism caused by collision with the stacked media. If in the media processing device the height of media stacked in a media storage unit 121, 122 is at a full stack level or over capacity level (step S33 returns yes or step S35 returns yes), an appropriate warning is output (step S34 or step S36) and collision accidents of the media transportation mechanism 131 can be prevented.

20 Claims, 8 Drawing Sheets

MEDIA PROCESSING DEVICE AND CONTROL METHOD FOR A MEDIA PROCESSING DEVICE

BACKGROUND OF THE INVENTION

1. Technical Field

The present invention relates to a media processing device that performs specific processes such as writing data to disc-shaped media such as CDs and DVDs and printing on the label side of the media, and to a control method for the media processing device.

2. Related Art

Media processing systems for reading and writing data on disc media such as CDs and DVDs, and printing on the label side of the media, generally include a media processing device and a host computer.

This media processing device comprises a media drive for writing data to the media, a label printer for printing on the label side of the media, and a media transportation mechanism for holding and carrying the media to the media storage unit, the media transfer position of the media tray disposed to the media drive, and the media transfer position of the label printer. The host computer controls operation of the media drive, the label printer, and the media transportation mechanism in the media processing device.

In order to enable continuous processing of a large number of media, the media storage unit of the media processing device may include both a supply stacker and a discharge stacker. The supply stacker stores numerous blank media stacked vertically. The discharge stacker similarly stores numerous processed media in a vertical stack after the data writing process or label printing process is completed. See, for example, Japanese Unexamined Patent Appl. Pub. JP-A-2000-260172 and Japanese Unexamined Patent Appl. Pub. JP-A-2002-056584.

The media processing device may execute various media transportation processes, including, for example, carrying the blank media stored in the supply stacker to the media transfer position of the internal media drive, and then carrying the processed media after the data writing process is completed in the media drive from the media transfer position of the media drive to the discharge stacker. The media may alternatively be carried after the data writing process is completed to the media transfer position of the internal label printer, and the processed media is then carried after the label is printed by the label printer from the media transfer position of the label printer to the discharge stacker.

As this media processing device continues operating and media are carried to the discharge stacker, the actual height of the media stack in the discharge stacker may exceed the maximum stackable height of the discharge stacker.

Japanese Unexamined Patent Appl. Pub. JP-A-H06-247617 teaches a full stacker detection device that detects if the number of printed sheets stored in the discharge stacker of a printer exceeds a certain level.

If the media transportation mechanism continues carrying media to the discharge stacker after the discharge stacker has become full, the transportation arm of the media transportation mechanism may collide with media stacked in the discharge stacker, possibly resulting in damage to the media transportation mechanism, damage to the stacked media, or damage to the media being carried to the discharge stacker, for example.

SUMMARY

With the media processing device and control method therefor according to at least one embodiment of the present invention, the media transportation mechanism does not convey media to the media storage unit when the height of the media stack in the media storage unit exceeds the maximum height of the stack at which media can be stacked by the transportation operation of the media transportation mechanism.

A media processing device according to a first aspect of at least one embodiment of the invention has a media storage unit that stores media; a media drive that writes data to the media; a media transportation mechanism that picks up media, carries the media to the media storage unit and a drive tray of the media drive, and releases the media at the destination; a media detector that detects the stack height of media stacked in the media storage unit; and a controller that determines if the media stack height detected by the media detector exceeds a maximum stack height for the media storage unit, and if the media stack height exceeds the maximum stack height outputs a warning that the maximum stack height is exceeded.

A media processing device according to another aspect of at least one embodiment of the invention has a media storage unit that stores media; a media transportation mechanism that picks up media, carries the media, and releases the media at the destination; a media detector that detects the stack height of media stacked in the media storage unit; and a controller that determines if the media stack height detected by the media detector exceeds a first value for the media storage unit, and if the media stack height exceeds the first value outputs a warning that the first value is exceeded.

Another aspect of at least one embodiment of the invention is a control method having a media storage unit that stores media, a media transportation mechanism that picks up media, carries the media, and releases the media at the destination, and a media detection unit that detects the stack height of media stacked in the media storage unit, the control method including: a detection step of detecting the media stack height; a first evaluation step of determining if the detected media stack height exceeds a first value for the media storage unit; and a warning step of outputting a warning that the first value is exceeded if the media stack height exceeds the first value.

The invention thus monitors the media stack height in the media storage unit and outputs a warning if the media stack height approaches a condition exceeding the maximum stack height. The operator of the media processing device can thus take action appropriate to the warning. More specifically, before the media transportation mechanism operates the operator can take action to remove media stacked above the maximum stack height from the media storage unit. Damage to the media transportation mechanism and damage to the media resulting from collision between the media transportation mechanism and media stacked above the maximum stack height can thus be prevented.

Preferably, the controller of the media processing device determines if the media stack height detected by the media detector exceeds a full stack level that is set lower than the maximum stack height, and if the media stack height exceeds the full stack level the controlled outputs a warning that the full stack level is exceeded.

This aspect of the invention outputs a warning that the full stack level is exceeded if the media stack height exceeds the full stack level. The full stack level is below the maximum stack height and is a height at which the media picking process is possible but the media release process is not possible. The operator can therefore be warned during the initialization process and the operator can quickly remove media before media is stacked to the maximum stack height during normal media processing. Damage to the media transportation mechanism and damage to the media resulting from collision between the media transportation mechanism and media stacked above the maximum stack height can thus be prevented during normal media processing.

In a media processing device according to another aspect of at least one embodiment of the invention the controller determines if the media stack height exceeds the maximum stack height when the media transportation mechanism executes the media picking process, detects the media stack height in the media storage unit from which media was picked after picking up media, and updates and stores the media stack height in the storage unit.

In a media processing device according to another aspect of at least one embodiment of the invention the controller determines if the media stack height exceeds the maximum stack height and determines if the media stack height exceeds the full stack level when the media transportation mechanism executes the media release process, detects the media stack height in the media storage unit in which media was released after releasing the media, and updates and stores the media stack height in the storage unit.

This aspect of the invention enables determining only if the maximum stack height is exceeded when picking up media, and therefore enables quickly executing the media picking process. When releasing the media, however, whether the full stack level is exceeded can be determined in addition to determining if the maximum stack height is exceeded, and the media releasing process can therefore be restricted when the media stack height exceeds the full stack level. It is therefore possible to prevent stacking media to the maximum stack height when proceeding to normal media processing and the media release process after the initialization process.

In the media processing device according to another aspect of at least one embodiment of the invention the media detector detects the distance descended by the media transportation mechanism from a predetermined height until the media on the top of the stack in the media storage unit is detected, and calculates the height of media stacked in the media storage unit by subtracting the distance descended from the predetermined height of the media transportation mechanism before descending.

Other objects and attainments together with a fuller understanding of the invention will become apparent and appreciated by referring to the following description and claims taken in conjunction with the accompanying drawings.

DESCRIPTION OF EMBODIMENTS

A preferred embodiment of a media processing device according to the present invention is described below with reference to the accompanying figures.

Figure 1:
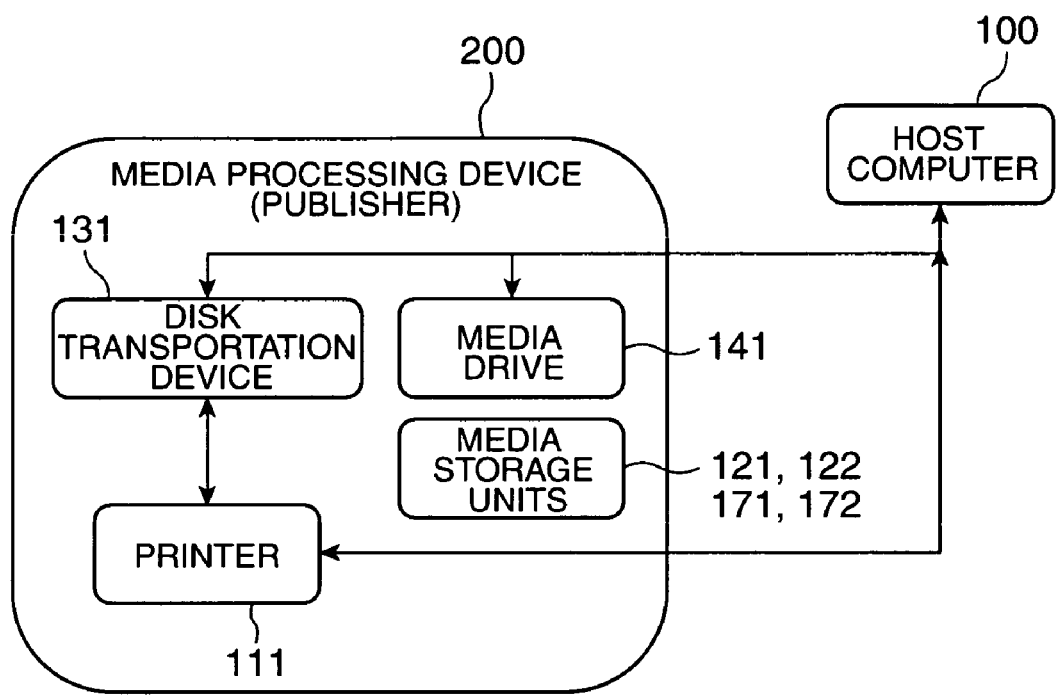
FIG. 1 is a schematic block diagram of a preferred embodiment of a media processing system incorporating a media processing device according to the present invention.
Figure 2:
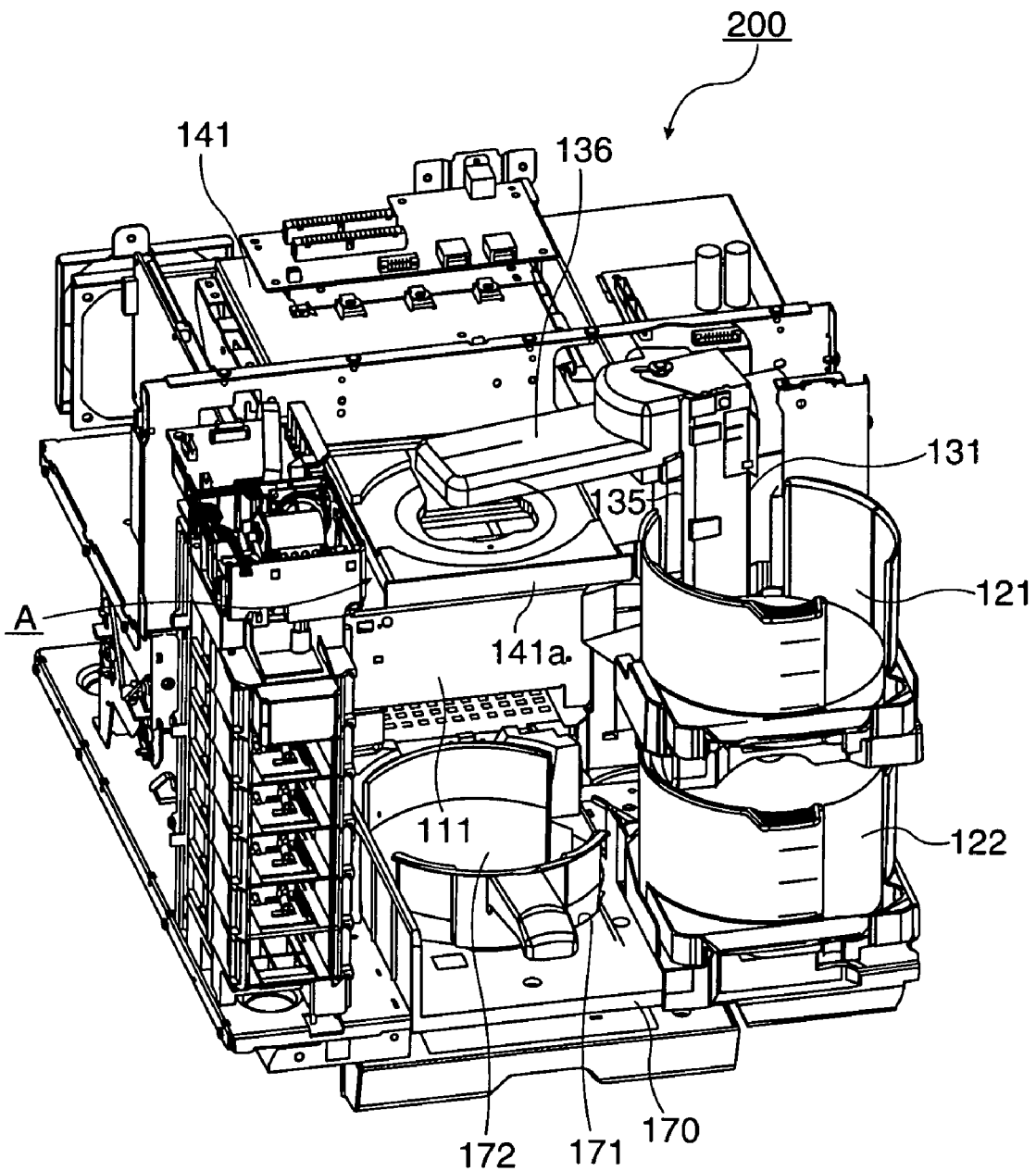
FIG. 2 is an oblique view showing the internal structure of the media processing device shown in FIG. 1.
Figure 3:
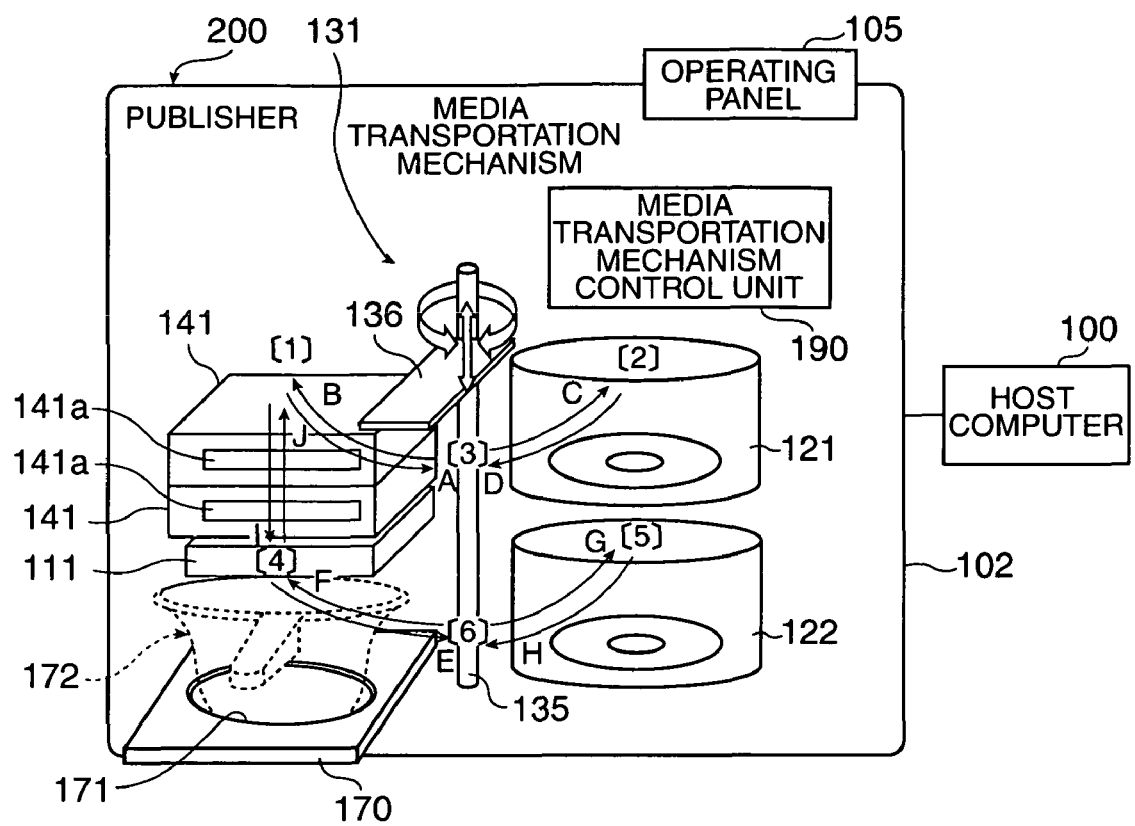
FIG. 3 describes the movement of the media transportation mechanism in the media processing device shown in FIG. 2.
Figure 4:
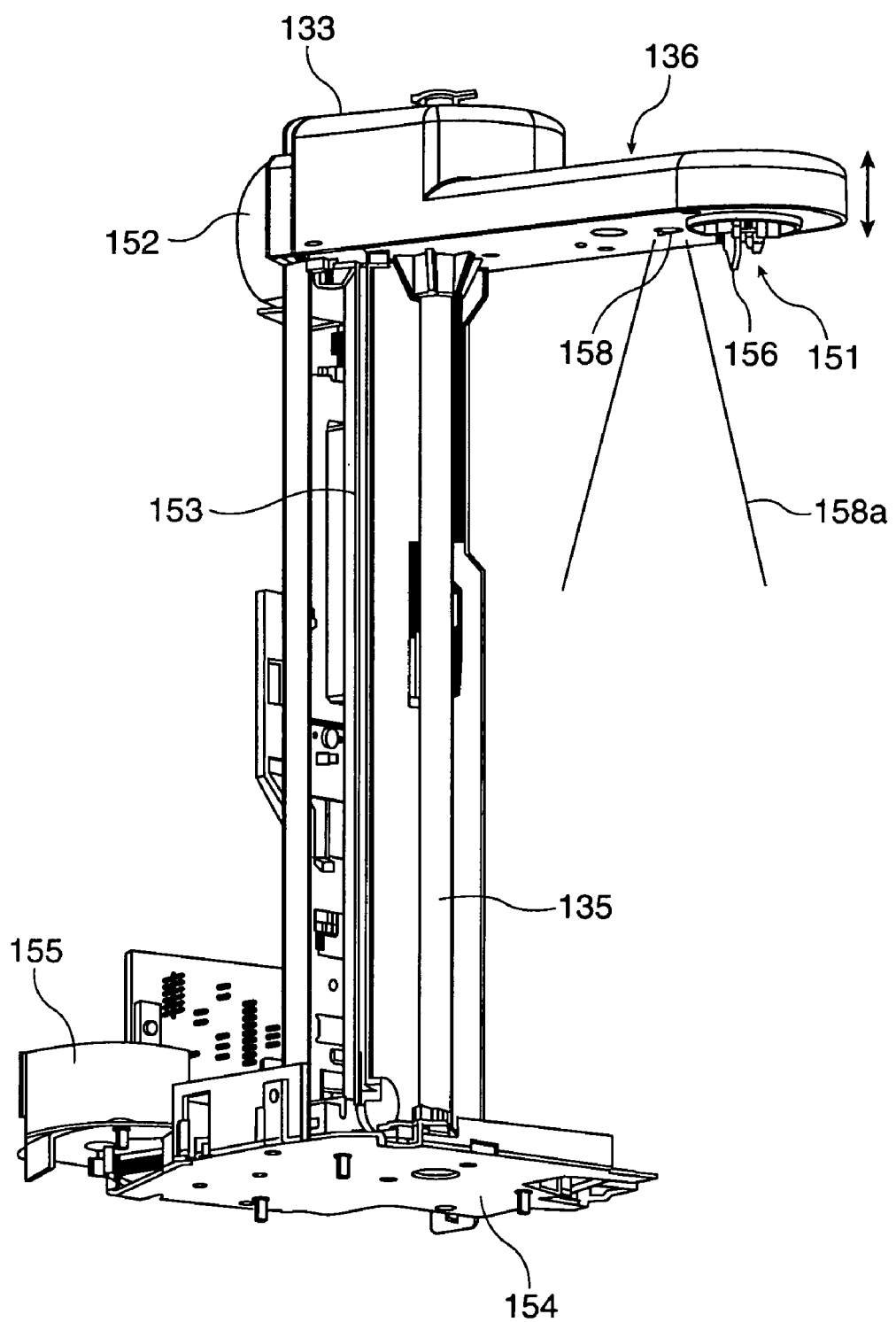
FIG. 4 is an enlarged oblique view of the media transportation mechanism shown in FIG. 2.
Figure 5:
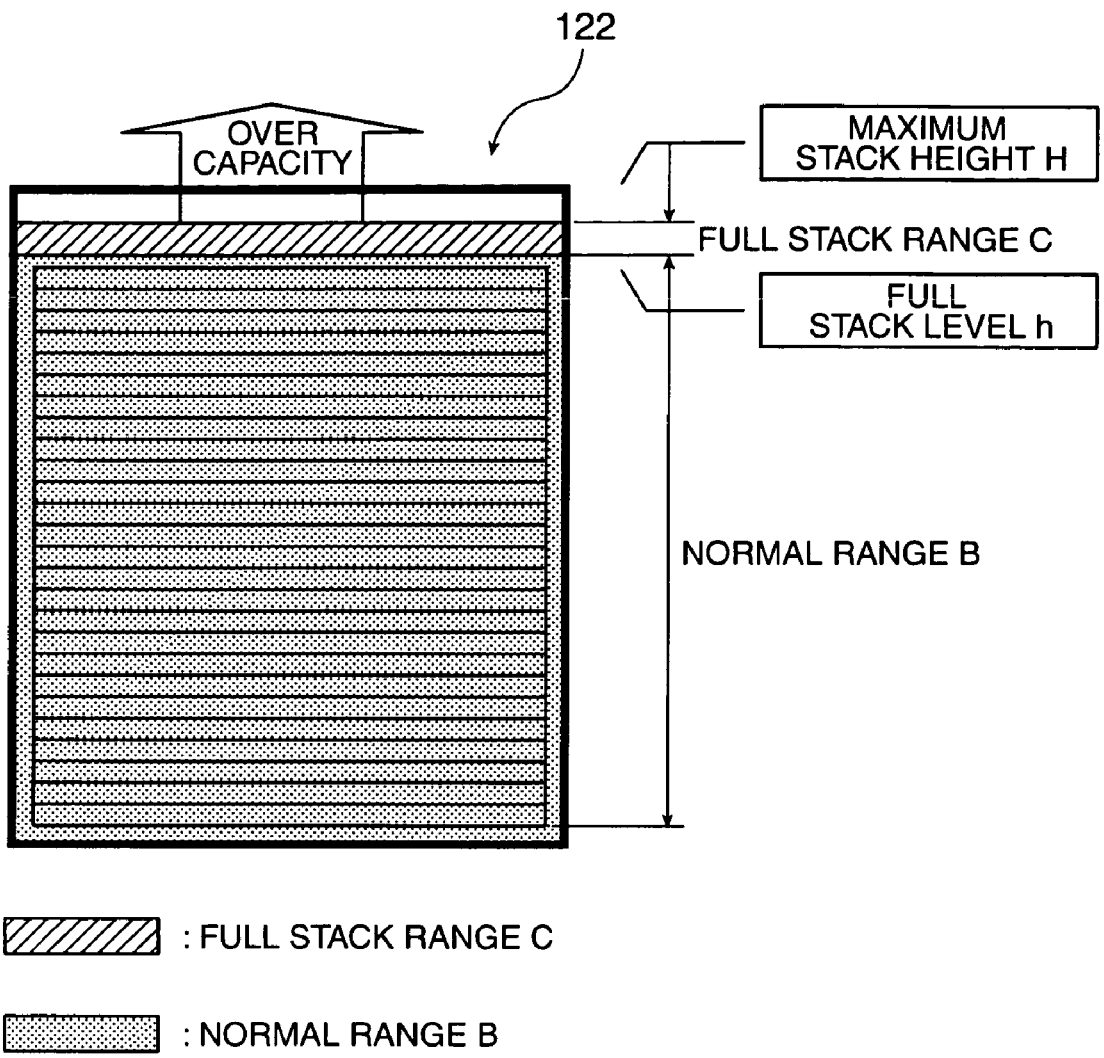
FIG. 5 describes the media stacking conditions in the media storage unit shown in FIG. 1.
Figure 6:
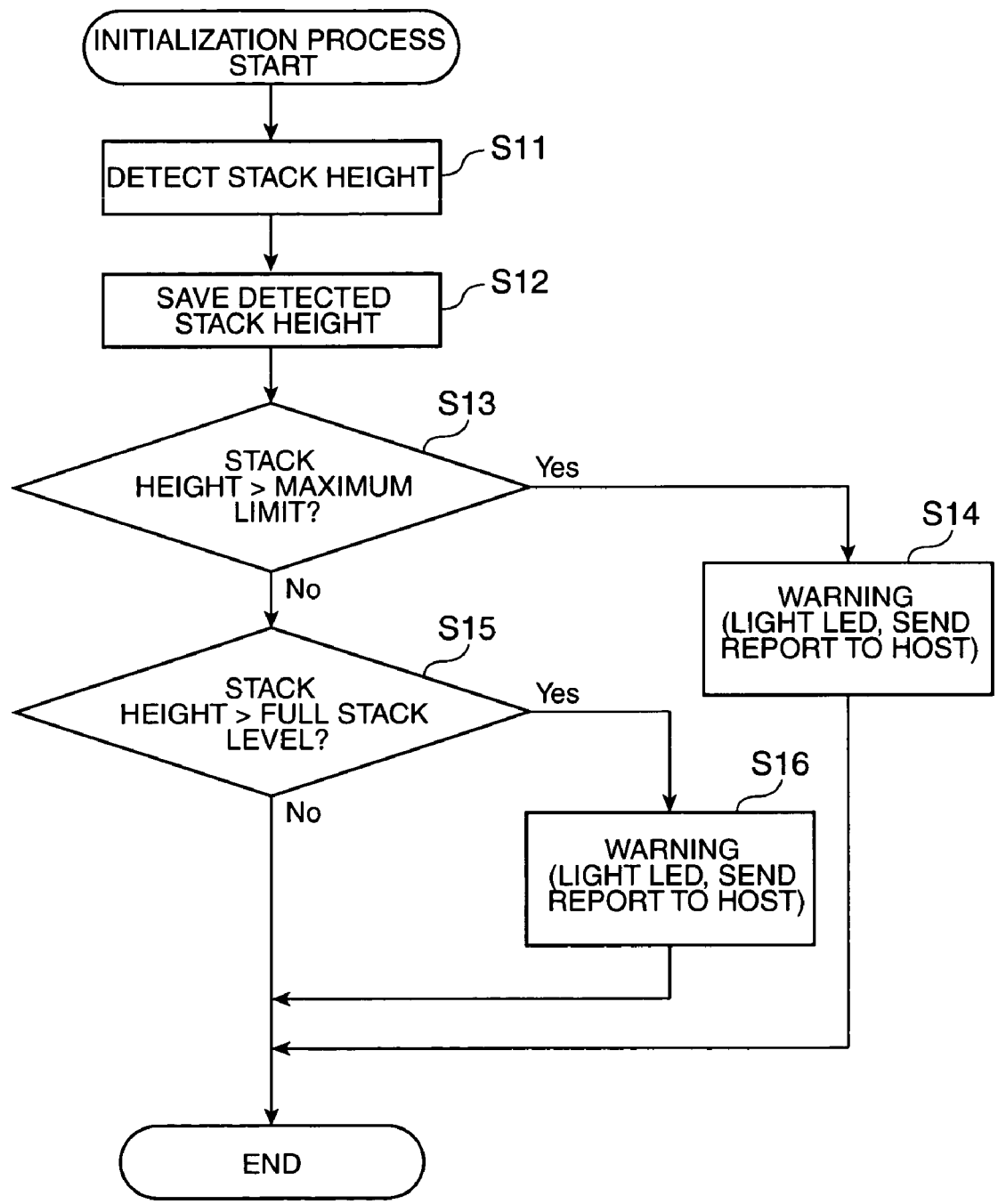
FIG. 6 is a flowchart describing the initialization process that is executed by the media processing device shown in FIG. 1 when the power turns on or the cover is closed.
Figure 7:
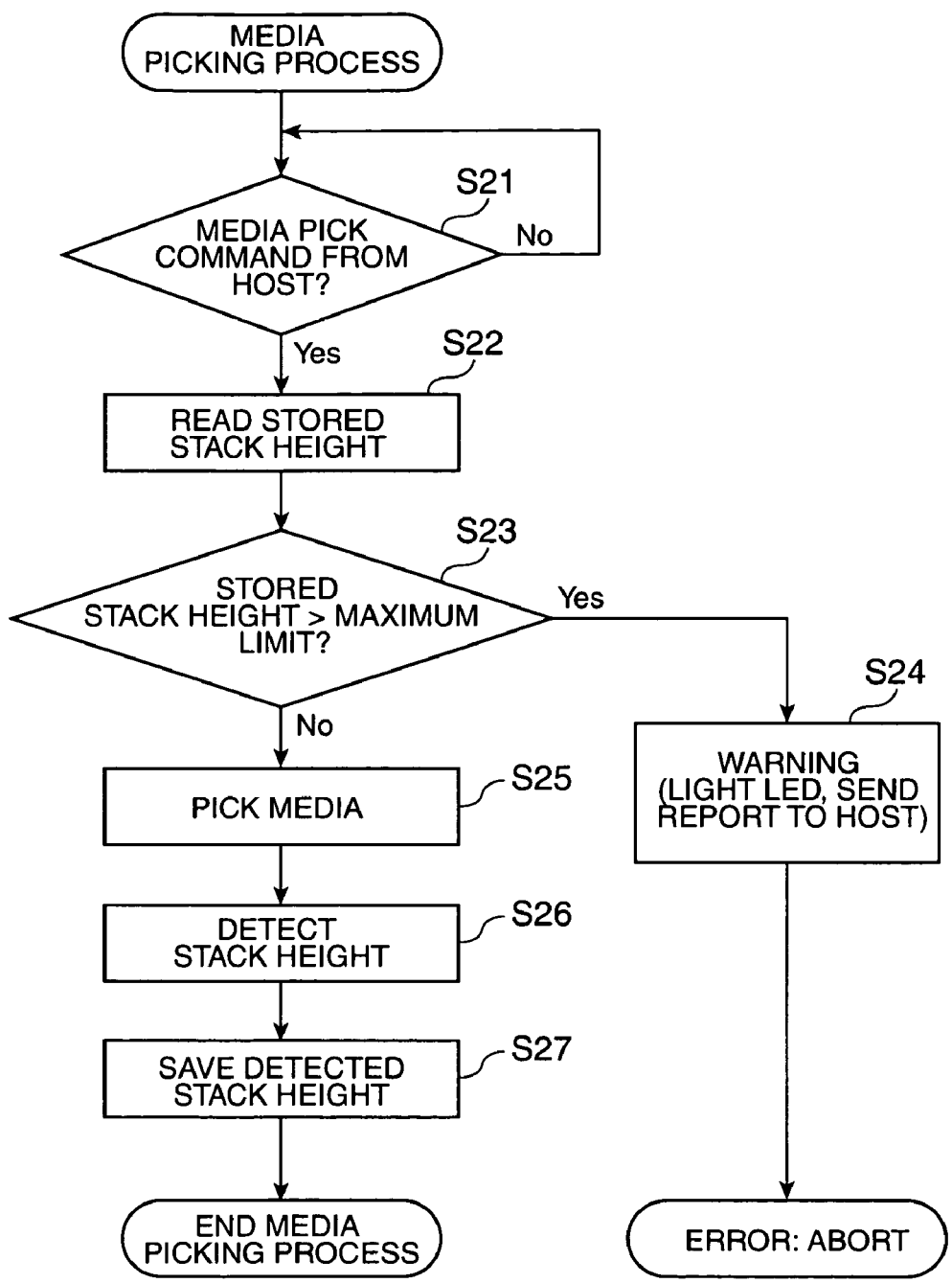
FIG. 7 is a flow chart describing the media picking process that is executed when the host computer sends a media picking command to the media processing device shown in FIG. 1.
Figure 8:
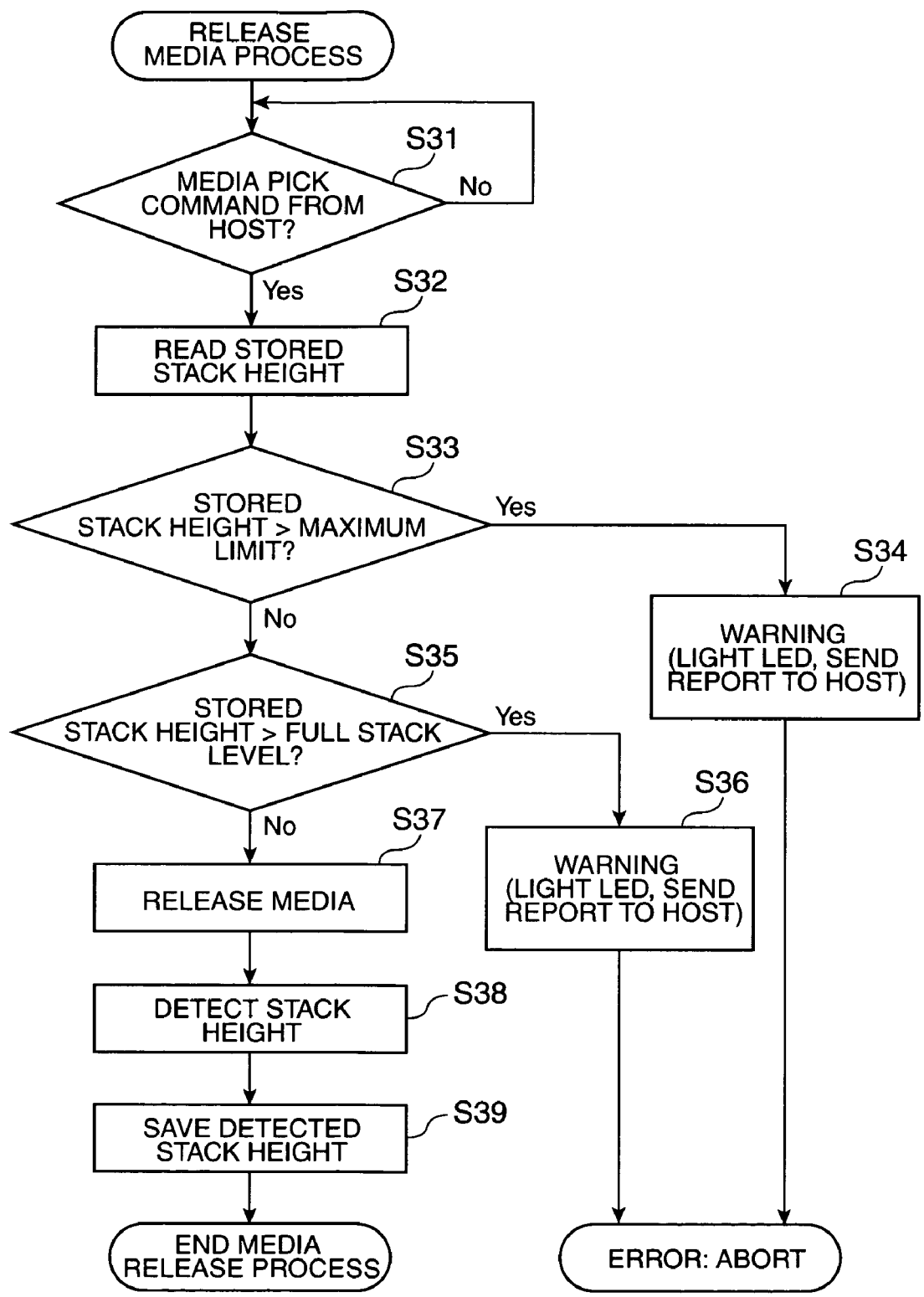
FIG. 8 is a flow chart describing the release process that is executed when the host computer sends a media release command to the media processing device shown in FIG. 1.

FIG. 1 is a schematic block diagram of a preferred embodiment of a media processing system incorporating a media processing device according to the present invention. FIG. 2 is an oblique view showing the internal structure of the media processing device shown in FIG. 1. FIG. 3 describes the movement of the transportation arm of the media transportation mechanism in the media processing device shown in FIG. 2. FIG. 4 is an enlarged oblique view of the media transportation mechanism shown in FIG. 2. FIG. 5 describes the media stacking conditions in the media storage unit shown in FIG. 1. FIG. 6 is a flow chart describing the initialization process that is executed by the media processing device shown in FIG. 1 when the power turns on or the cover is closed. FIG. 7 is a flow chart describing the media picking process that is executed when the host computer sends a media picking command. FIG. 8 is a flow chart describing the release process that is executed when the host computer sends a media release command.

The media processing system shown in FIG. 1 includes a media processing device 200 and a host computer 100. The media processing device 200 reads and writes data on disc-shaped media such as CDs and DVDS, and prints on the label side of the media. The invention is not limited to this configuration, however, and can be applied to any processing device that has a media storage unit, a mechanism for transporting media, and a configuration for detecting the media stack height.

As shown in FIG. 2 and FIG. 3, the media processing device 200 has first to fourth media storage units 121, 122, 171, and 172 for storing disc-shaped media such as CDs and DVDs, two media drives 141 for writing data to the media, a printer 111 for printing on the label side of the media, and a media transportation mechanism 131. The media transportation mechanism 131 holds and carries the media between the media storage units 121, 122, 171, and 172, the media transfer position A of the drive trays 141a of the media drives 141, and the media transfer position of the printer 111.

Operation of the media drives 141, the printer 111, and the media transportation mechanism 131 of the media processing device 200 can be controlled by the host computer 100.

FIG. 2 shows the arrangement of the devices inside the media processing device 200 with the outside walls rendered by a box-like case 102 not shown. Access covers not shown that can open to the right and left sides are also disposed on the front of the case 102. An operating panel 105 populated with having indicators and operating buttons is disposed to the top right part of the case 102 as shown in FIG. 3.

When the access covers not shown disposed to the front of the case 102 are opened, the media storage units 121, 122, 171, and 172, printer 111, and other components shown in FIG. 2 are exposed, enabling the operator to load and remove media from the media storage units 121, 122, 171, and 172 and replace the ink cartridge of the printer 111.

The basic application of each of the first to fourth media storage units 121, 122, 171, and 172 is preset.

The first media storage unit 121 shown at the bottom right in FIG. 2 is basically used as a supply stacker for storing a plurality of (such as 50) blank media (unused media to which data has not been written) in a vertical stack, but can also be used to store processed media after the data writing process or the label printing process.

The second media storage unit 122 located directly below the first media storage unit 121, and the fourth media storage unit 172 located on the left side of the second media storage unit 122, are basically used as discharge stackers for storing a plurality of (such as 50) processed media (the media after the data writing process or the label printing process is completed) in a vertical stack, but can also be used to store blank media.

The fourth media storage unit 172 holds a removable third media storage unit 171, which is shaped like a bucket with a handle. The third media storage unit 171 is used to store a smaller number of media in a recess formed in a drawer 170 that can slide in and out at the front of the media processing device 200.

As shown in FIG. 3 and FIG. 4, the media transportation mechanism 131 has a vertical guide shaft 135 disposed vertically inside the case 102, and a transportation arm 136 supported so that it can move up and down and pivot on the vertical guide shaft 135. Fingers 151 for holding the center hole of the media are disposed in the middle at the distal end of the transportation arm 136.

A part of the transportation arm 136 is connected to a timing belt 153, which is driven in a loop behind the vertical guide shaft 135 by means of an elevator motor 152, so that as the timing belt 153 moves, the transportation arm 136 travels up or down on the vertical guide shaft 135.

The transportation arm 136 is formed in unison with a horizontal support plate 154 attached pivotably to the bottom end of the vertical guide shaft 135, and can swing around the vertical guide shaft 135 when a fan-shaped gear not shown affixed to the top of the horizontal support plate 154 is driven rotationally around the vertical guide shaft 135 by the pivot motor 155.

A media detector 156 for detecting if media is present, and a light 158 that outputs illumination 158a downward, are disposed near the fingers 151 of the transportation arm 136.

The media detector 156 is disposed so that it can descend and retract from the bottom of the transportation arm 136, and detects that media is present when the transportation arm 136 descends to the top of the media in the media storage unit, for example, and the media detector 156 contacts the media and is pushed inside the transportation arm 136.

The detection result from the media detector 156 is used to calculate the start timing of the media picking operation of the fingers 151, and to detect the stack height of media in the media storage units 121, 122, 171, and 172.

Using different combinations of the pivoting actions indicated by arrows A to H in FIG. 3 and the elevator actions indicated by arrows I and J, the transportation arm 136 moves the position of the fingers to the points indicated by numbers [1] to [6] in the figure, and carries media between the media storage units 121, 122, 171, and 172, the drive trays 141a of the media drives 141, and the media transfer position of the printer 111.

More specifically, the points [1] to [6] in FIG. 3 are: [1] the home position (standby position) of the transportation arm 136; [2] the position of the first media storage unit 121; [3] a desired position between the home position and the first media storage unit 121; [4] a midpoint; [5] the position of the second media storage unit 122; and [6] a desired position between the midpoint and the second media storage unit 122.

As shown in FIG. 3, the media processing device 200 has a media transportation mechanism control unit 190 that controls driving the media transportation mechanism 131. This media transportation mechanism control unit 190 can communicate with the host computer 100. The media transportation mechanism control unit 190 has firmware for controlling the movement of the transportation arm 136 in response to transportation arm 136 movement commands sent from the host computer 100, and thus transports the media according to the transportation arm 136 movement command sent from the host computer 100.

As the media processing device 200 continues to carry media between the media storage units 121, 122, 171, and 172, one or more of the media storage units could become filled beyond the maximum stack height H (first value) to which media can be stacked in the media storage unit by the media transportation mechanism 131. The two reference heights set for each media storage unit are described next with reference to FIG. 5.

FIG. 5 shows the media stack that grows in the second media storage unit 122.

This embodiment of the invention sets two reference heights for the second media storage unit 122. The maximum stack height H is set to a value at which the transportation arm 136 can be expected to collide with the stacked media if the media is stacked to a height exceeding this value. In other words, the maximum stack height H is the maximum height at which the transportation arm 136 can pivot normally without touching the stacked media during the transportation process.

The full stack level h (second value) is the height at which the transportation arm 136 can pick up media but cannot release media, and is set lower than the maximum stack height H.

In this embodiment of the invention the range from the bottom of the media storage unit to the full stack level h is normal range B, and the range from the maximum stack height H to the full stack level h is the full stack range C. If the disc M at the top of the stack is within the full stack range C, the stack is said to be full (a full stack), and if the disc M at the top of the stack is above the maximum stack height H, the stack is said to be over capacity. If the transportation arm 136 tries to pass over the second media storage unit 122 when the stack is over capacity, the transportation arm 136 will collide with the top disc M in the stack.

Therefore, if an over capacity condition occurs, the media processing device 200 according to this embodiment of the invention enables a controlling operation so that the transportation arm 136 of the media transportation mechanism 131 does not pass over the second media storage unit 122 and collide with the media. More specifically, the media processing device 200 monitors the media stack height in each of the media storage units 121, 122, 171, and 172, and issues a warning or limits operation of the media transportation mechanism 131 according to the stack height.

More specifically, when the media processing device 200 turns on or an access cover not shown for loading and removing media from the media storage units 121, 122, 171, and 172 is closed, the initialization process shown in FIG. 6 is executed.

The process shown in FIG. 6 is the initialization process that is executed when the media processing device 200 turns on or an access cover not shown for loading and removing media from the media storage units 121, 122, 171, and 172 is closed. It is assumed below that the fourth media storage unit 172 is set in the third media storage unit 171.

When the power turns on or the cover is closed, the operator may have loaded or removed media from the media storage units 121, 122, 171, and 172 and the height of the media stack may have changed. The media stack height in each of the media storage units 121, 122, 171, and 172 is therefore detected again.

When it is detected that the media processing device 200 turned on or the cover closed, the initialization process starts and the transportation arm 136 of the media transportation mechanism 131 detects the height of the media stack in each of the stackers 121, 122, 172 (step S11). The detected media height is then stored in a predetermined recording means (storage means) in the media transportation mechanism control unit 190 (step S12).

The media height in each media storage unit is detected as follows.

The transportation arm 136 moves to a position above the media storage unit in which the media height is to be measured, and the transportation arm 136 then descends. To detect the media height in the first media storage unit 121, the transportation arm 136 moves to position [2] above the stacker 121 shown in FIG. 3 and then descends. The number of steps the elevator motor 152 moves until the media detector 156 detects the top disc is counted. The distance of the descent corresponding to the number of counted steps is then subtracted from the height of the transportation arm 136 at a predetermined position before descent starts to calculate the stack height of the media in the media storage unit.

Whether the media stack height saved in step S12 exceeds the maximum stack height H shown in FIG. 5 is then determined (step S13). If the media stack height exceeds the maximum stack height H (step S13 returns Yes), an over capacity warning is output by causing an indicator on the operating panel 105 to light, for example. The media storage unit where the over capacity state was detected is also reported to the host computer 100 (step S14).

If in step S13 the media stack height does not exceed the maximum stack height H (step S13 returns No), whether the media stack height saved in step S12 exceeds the full stack level h is determined (step S15). If the media stack height exceeds the full stack level h (step S15 returns Yes), a full stack warning is output by causing an indicator on the operating panel 105 to light, for example. The media storage unit where the full stack was detected is also reported to the host computer 100 (step S16).

If in step S15 the full stack level h is not exceeded (step S15 returns No), neither the over capacity or the full stack conditions apply. More specifically, the media stacked in the media storage unit are within the normal range B, and the transportation arm 136 is confirmed to be able to operate normally.

This same process is applied to each other media storage units, and the initialization process then ends.

The normal media transportation process that executes after the initialization process is described next with reference to FIG. 7 and FIG. 8. The media picking process is described first with reference to FIG. 7. The process shown in FIG. 7 is executed when a media pick command is received from the host computer 100 after the initialization process.

When a media pick command is received from the host computer 100 (step S21 returns Yes), the media height of the specified media storage unit is read from the media height values of the media storage units saved in the recording means in step S12 in FIG. 6 (step S22).

Whether the read media height exceeds the maximum stack height H shown in FIG. 5 is then determined (step S23). If the media stack height exceeds the maximum stack height H (step S23 returns Yes), an over capacity warning is output by causing an indicator on the operating panel 105 to light, for example. The media storage unit where the over capacity state was detected is also reported to the host computer 100 (step S24).

If in step S23 the media stack height does not exceed the maximum stack height H (step S23 returns No), the transportation arm 136 moves to the position of the specified media storage unit, descends, and picks up the single media M on the top of the stack (step S25). After the media M is picked up, the height of the remaining stack is detected (step S26). Media height detection in this case does not use the transportation arm 136. Rather the height equal to the thickness of one disc is subtracted from the media stack height read in step S22. The detected media stack height is updated and saved (step S27), and the media picking process ends.

The media release process is described next with reference to FIG. 8. The process shown in FIG. 8 executes when a media release command is received from the host computer 100 after the initialization process.

When a media release command is received from the host computer 100 (step S31 returns Yes), the media height of the specified media storage unit is read from the media height values of the media storage units saved in the recording means (step S32).

Whether the read media height exceeds the maximum stack height H shown in FIG. 5 is then determined (step S33). If the media stack height exceeds the maximum stack height H (step S33 returns Yes), an over capacity warning is output by causing an indicator on the operating panel 105 to light, for example. The media storage unit where the over capacity state was detected is also reported to the host computer 100 (step S34).

If in step S33 the media stack height does not exceed the maximum stack height H (step S33 returns No), whether the read media stack height exceeds the full stack level h is determined (step S35). If the media stack height exceeds the full stack level h (step S35 returns Yes), a full stack warning is output by causing an indicator on the operating panel 105 to light, for example. The media storage unit where the full stack was detected is also reported to the host computer (step S36).

If in step S35 the full stack level h is not exceeded (step S35 returns No), neither the over capacity or the full stack conditions apply. More specifically, the media stacked in the media storage unit specified for releasing the disc are within the normal range B, and the transportation arm 136 is confirmed to be able to operate normally. The transportation arm 136 therefore moves to the position of the media storage unit where the media is to be released, descends, and releases the held single media M held by the transportation arm 136 onto the top of the stack (step S37). After the media M is released, the height of the stack is detected (step S38). Media height detection in this case uses the transportation arm 136, and detects the stack height in the same way as in the initialization process described in step S11 in FIG. 6. The detected media stack height is updated and saved (step S39), and the media release process ends.

This embodiment of the invention monitors the stack height of media in each media storage unit during operation of the media processing device 200, and outputs a warning if any media storage unit is detected to be in an over capacity state or full stack state. If a command for releasing media into a media storage unit that is in a full stack state is received from the host computer, the media processing device 200 does not execute the release command.

As thus described, if during operation of the media processing device 200 the media height in any of the media storage units approaches an over capacity state exceeding the maximum height to which media can be stacked by the media transportation mechanism 131, the media processing device 200 issues a warning without executing the pickup command or release command received from the host computer 100. Damage to the media transportation mechanism, damage to the media, and other problems caused by the transportation arm 136 colliding with media stacked in a media storage unit can thus be reliably prevented.

Furthermore, because an appropriate warning is issued to the operator if a full stack or over capacity condition occurs, the operator can quickly act to correct the stack full or over capacity condition.

In addition, the media processing device 200 according to this embodiment of the invention executes the initialization process shown in FIG. 6 whenever the power turns on or the cover closes to remeasure the stack height of media in each media storage unit. As a result, if the operator adds or removes media to a media storage unit so that the media stack height in the media storage unit changes from the previous height, the new media stack height in the media storage unit can be accurately determined.

Furthermore, each time the media transportation mechanism executes a media transportation process (picking process or releasing process) after the initialization process, the media stack height stored in the recording means can be updated. By thus constantly monitoring the media stack height in each media storage unit, collision of the media transportation mechanism 131 with the media can be reliably prevented.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. A media processing device comprising:
   a media storage unit that stores media;
   a media drive that writes data to the media;
   a media transportation mechanism that picks up media, carries the media to the media storage unit and a drive tray of the media drive, and releases the media at the destination in a media picking apparatus;
   a media detector that detects the stack height of media stacked in the media storage unit; and
   a controller that determines if the media stack height detected by the media detector exceeds a maximum stack height for the media storage unit, and if the media stack height exceeds the maximum stack height outputs a first warning that the maximum stack height is exceeded.

2. The media processing device described in claim 1, further comprising:
   a storage unit that stores the detected media stack height.

3. The media processing device described in claim 1, wherein:
   the controller determines if the media stack height detected by the media detector exceeds a full stack level that is set lower than the maximum stack height.

4. The media processing device described in claim 3, wherein:
   the controller outputs a second warning if the media stack height exceeds the full stack level.

5. The media processing device described in claim 1, wherein:
   the controller determines if the media stack height exceeds the maximum stack height when the media transportation mechanism executes the media picking process.

6. The media processing device described in claim 5, wherein:
   the controller detects the media stack height in the media storage unit from which media was picked after picking up media, and updates and stores the media stack height in the storage unit.

7. The media processing device described in claim 3, wherein:
   the controller determines if the media stack height exceeds the maximum stack height and determines if the media stack height exceeds the full stack level when the media transportation mechanism executes the media release process.

8. The media processing device described in claim 7, wherein:
   the controller detects the media stack height in the media storage unit in which media was released after releasing the media, and updates and stores the media stack height in the storage unit.

9. The media processing device described in claim 1, wherein:
   the media detector detects the distance descended by the media transportation mechanism from a predetermined height until a media on the top of the stack in the media storage unit is detected.

10. The media processing device described in claim 9, wherein:
    the media detector calculates the height of media stacked in the media storage unit by subtracting the distance descended from the predetermined height of the media transportation mechanism before descending.

11. A media processing device comprising:
    a media storage unit that stores media;
    a media transportation mechanism that picks up media, carries the media, and releases the media at the destination;
    a media detector that detects the stack height of media stacked in the media storage unit; and
    a controller that determines if the media stack height detected by the media detector exceeds a first value for the media storage unit, and if the media stack height exceeds the first value outputs a first warning that the first value is exceeded.

12. The media processing device described in claim 11, further comprising:
    a storage unit that stores the detected media stack height.

13. The media processing device described in claim 11, wherein:
    the controller determines if the media stack height detected by the media detector exceeds a second value that is set lower than the first value, and if the second value is exceeded outputs a second warning that the second value is exceeded.

14. The media processing device described in claim 11, wherein:
    the controller determines if the media stack height exceeds the first value when the media transportation mechanism executes the media picking process.

15. The media processing device described in claim 14, wherein:
    the controller detects the media stack height in the media storage unit from which media was picked after picking up media, and updates and stores the media stack height in the storage unit.

16. The media processing device described in claim 13, wherein:
    the controller determines if the media stack height exceeds the first value and determines if the media stack height exceeds the second value when the media transportation mechanism executes the media release process.

17. The media processing device described in claim 16, wherein:
    the controller detects the media stack height in the media storage unit in which media was released after releasing the media, and updates and stores the media stack height in the storage unit.

18. The media processing device described in claim 11, wherein:

the media detector detects the distance descended by the media transportation mechanism from a predetermined height until the media on the top of the stack in the media storage unit is detected.

19. The media processing device described in claim 18, wherein:

the media detector calculates the height of media stacked in the media storage unit by subtracting the distance descended from the predetermined height of the media transportation mechanism before descending.

20. A control method for a media processing device having a media storage unit that stores media, a media transportation mechanism that picks up media, carries the media, and releases the media at the destination, and a media detection unit that detects the stack height of media stacked in the media storage unit, the control method comprising:

a detection step of detecting the media stack height;

a first evaluation step of determining if the detected media stack height exceeds a first value for the media storage unit; and a warning step of outputting a warning that the first value is exceeded if the media stack height exceeds the first value.

* * * * *

UNITED STATES PATENT AND TRADEMARK OFFICE
CERTIFICATE OF CORRECTION

PATENT NO.         : 8,181,191 B2
APPLICATION NO.    : 12/284196
DATED              : May 15, 2012
INVENTOR(S)        : Kazuya Toshima Page 1 of 1

It is certified that error appears in the above-identified patent and that said Letters Patent is hereby corrected as shown below:

Title Page; item (73) should read,

Assignee: Seiko Epson Corporation, Tokyo (JP)

Signed and Sealed this
Thirteenth Day of November, 2012

David J. Kappos
*Director of the United States Patent and Trademark Office*